United States Patent [19]

Hsu

[11] Patent Number: 5,631,970
[45] Date of Patent: May 20, 1997

[54] PROCESS FOR IDENTIFYING SIMPLE AND COMPLEX OBJECTS FROM FUSED IMAGES AND MAP DATA

[76] Inventor: Shin-yi Hsu, 2312 Hemlock La., Vestal, N.Y. 13850

[21] Appl. No.: 66,691

[22] Filed: May 21, 1993

[51] Int. Cl.$^6$ .................................................. G06K 9/36
[52] U.S. Cl. .......................... 382/113; 348/119; 382/203; 395/61
[58] Field of Search ........................... 382/1, 16, 19, 382/20, 22, 48, 45, 41; 364/274.6; 395/61; 348/116–120, 122, 123

[56] References Cited

U.S. PATENT DOCUMENTS

| | | | |
|---|---|---|---|
| 4,179,693 | 12/1979 | Evans et al. | 343/5 MM |
| 4,688,092 | 8/1987 | Kamel et al. | 382/45 |
| 4,689,748 | 8/1987 | Hofmann | 348/117 |
| 4,752,836 | 6/1988 | Blanton et al. | 348/123 |
| 4,763,277 | 8/1988 | Ashford et al. | 364/513 |
| 4,803,642 | 2/1989 | Muranaga | 364/513 |
| 4,807,158 | 2/1989 | Blanton et al. | 348/123 |
| 4,821,212 | 4/1989 | Heartz | 348/123 |
| 4,860,214 | 8/1989 | Matsuda et al. | 364/513 |
| 4,885,705 | 12/1989 | Choi | 364/525 |
| 4,906,940 | 3/1990 | Greene et al. | 382/16 |
| 4,975,696 | 12/1990 | Salter, Jr. et al. | 348/117 |
| 4,984,279 | 1/1991 | Kidney et al. | 382/1 |
| 4,999,786 | 3/1991 | Mizutani et al. | 364/513 |
| 5,018,215 | 5/1991 | Nasr et al. | 382/1 |
| 5,050,222 | 9/1991 | Lee | 382/21 |
| 5,127,063 | 6/1992 | Nishiya et al. | 382/8 |
| 5,131,074 | 7/1992 | Nakamura et al. | 395/61 |
| 5,144,685 | 9/1992 | Nasar et al. | 382/48 |

*Primary Examiner*—Joseph Mancuso
*Attorney, Agent, or Firm*—Salzman & Levy

[57] ABSTRACT

The present invention features a method of identifying and/or extracting an object from multiple fused information sources, such as maps and images. The system allows a user to integrate information freely from multiple sources, such as maps, socio-economic data and various types of images. Data is first retrieved and then processed to transform its pixel representation to a region representation. The region representation is then refined by merging mechanisms, such as segmentation. The identified and/or extracted object can then be visualized by the user. Features or objects can then be extracted using the user's expert rules and confidence levels, which confidence levels may be derived by fuzzy logic.

5 Claims, 7 Drawing Sheets
(3 of 7 Drawing(s) in Color)

| Feature | Class | Attributes | Value | Description |
|---------|-------|------------|-------|-------------|
| SOILS | Polygons | Soil-code | | Abreviation for soil type |
| | | | 0 | Unsuitable |
| | | | 1 | Poor suitability |
| | | | 2 | Moderate suitability |
| | | | 3 | Good suitability |
| LANDUSE | Polygons | Lu-code | 100 | Urban |
| | | | 200 | Agriculture |
| | | | 300 | Brushland |
| | | | 400 | Forest |
| | | | 500 | Water |
| | | | 600 | Wetlands |
| | | | 700 | Barren |
| STREAMS | Lines | Strm-code | 1 | Major stream |
| | | | 2 | Minro stream |
| SEWERS | Lines | Diameter | | Actual diameter is stored |
| | | Symbol | 1 | 60 cm pipe |
| | | | 77 | 45 cm pipe |
| ROADS | Lines | Rd-code | 1 | Improved |
| | | | 2 | Semi-Improved |

Layer

    

*Figure 2* (PRIOR ART)

PROCESS FOR IDENTIFYING SIMPLE AND COMPLEX OBJECTS FROM FUSED IMAGES AND MAP DATA

FIELD OF THE INVENTION

The present invention pertains to techniques for identifying objects from images and, more particularly, to a technique for identifying and/or extracting an object or group of objects from one or more fused images and map data.

BACKGROUND OF THE INVENTION

Since the launch of the Earth Resources Technological Satellite (ERTS) in 1972, satellite imagery-based information acquisition, dissemination and exploitation (e.g., for natural resources monitoring and assessment) has reached a billion dollar industry. The importance of spatial data handling (as opposed to conventional aspatial statistical analysis) was recognized in the early 1970s, but commercial applications of this field were not realized until the early 1980s, when lower-cost microcomputer technology was accepted as a platform for spatial data analysis.

The field of spatial data handling is known today as Geographical Information System (GIS), and includes "an organized collection of computer hardware, software, geographical data and personnel designed to efficiently capture, store, update, manipulate, analyze, and display all forms of geographically referenced information" (ESRI: Understanding GIS: The ARC/INFO Method, 1992).

Images could be combined and/or analyzed to a certain degree, as could map data. But heretofore, no successful process for combining image and map data and analyzing same has been implemented.

The potential benefit from combining image and map data into one integrated information system was recognized as early as the mid-1980s, but integration of image analysis and GIS has been limited essentially to visual overlay analysis. Commercially-available GIS systems do not provide an effective and efficient mechanism for a total, seamless integration between image and map data.

This artificial separation is largely due to historical factors and partly due to the inherent dissimilarity between image and map data, as hereinbelow described. Historically, cartographers used point, line and area symbols to generate a map. Traditionally, map data were stored in a vector format as points, lines or polygons. In contrast, image processing and remote sensing researchers treated image data as a set of matrices. Therefore, by default, image data were and continue to be coded in a raster format.

This dichotomy between vector and raster data format is reinforced by the inherent characteristics of images vs. maps. The building block of image-based information is a pixel, whereas that of a map is a polygon. (A point or a line is a special case of a polygon.)

Spatial relationship analysis between two or more layers of images is exceptionally difficult to perform. A buffer zone (a zone generated within a given distance of a specified set of coverage features) might be used to combine two or more overlaid images (sewer lines and streams, for example), using conventional image processing methods. This is called "vertical integration". But how could an imaging processing system be used to indicate that a feature such as brushland from a first band is located "within" a buffer zone created by a stream system in a second band? The term "horizontal integration" is used to describe the traversal of spatial locations on one plane. It can be seen, therefore, that the field of image analysis lends itself to principles not only of data processing, but of fuzzy logic and expert systems.

Conventional image processing is not designed to handle spatial relationships. Fundamentally, words such as "within", "surrounding", "touches", "left of", "near", etc. cannot be used or understood. This is unfortunate, because even if an expert system were created to handle spatial and aspatial data efficiently, the need for a complex programming language would tend to defeat an obvious goal: simplicity of use. Researchers would find a powerful analysis tool to be unmanageable due to its operative complexity.

It would be advantageous to allow GIS, image processing, and remote sensing users to improve their capability in object extraction, change detection and map information updating.

It would also be advantageous to provide a mechanism for using a variety of data sources for a common geographical region.

It would also be advantageous to provide a system for facilitating simultaneous spatial and aspatial information fusion and analysis.

It would also be advantageous to provide an expert system (interactive or automated), including a rule set, capable of understanding English-language statements.

It would also be advantageous to provide a system for performing vertical and horizontal information integration simultaneously.

It would also be advantageous to reduce the cost of GIS usage through an efficient and effective information integration between imagery and map data.

SUMMARY OF THE INVENTION

In accordance with the present invention, there is provided a method of identifying and/or extracting an object from multiple information sources, such as maps and images. The system allows a user to integrate information freely from multiple sources, such as maps, socio-economic data and various types of images. Data is first retrieved and then processed to transform its pixel representation to a region representation. The region representation is then refined by merging mechanisms, such as segmentation. The identified and/or extracted object can then be visualized by the user. Features or objects can then be extracted using the user's expert rules and confidence levels, which confidence levels may be derived by fuzzy logic.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A complete understanding of the present invention may be obtained by reference to the accompanying drawings, when considered in conjunction with the subsequent, detailed description, in which:

FIG. 2 is data dictionary necessary for use with the prior art;

DETAILED DESCRIPTION OF THE PREFERRED EMBODIMENT

Referring now to FIGS. 1a–1e, one of the most sophisticated GIS systems of the prior art, the ESRI ARC/INFO method, is considered. In the ESRI publication, *Understanding GIS: The ARC/INFO Method*, a real-world problem is presented as follows:

"A local university is planning to construct a small lab and office building to perform research and extension projects in aquaculture. They've narrowed the location down to a coastal farming area near several small towns. They need to select a site that meets the following requirements:

Preferred land use is brushland

Choose soil types that are suitable for development

Site must lie within 300 meters of existing sewer lines

Site must lie 20 meters beyond existing streams

Site must contain at least 2,000 square meters."

Figure 1A:
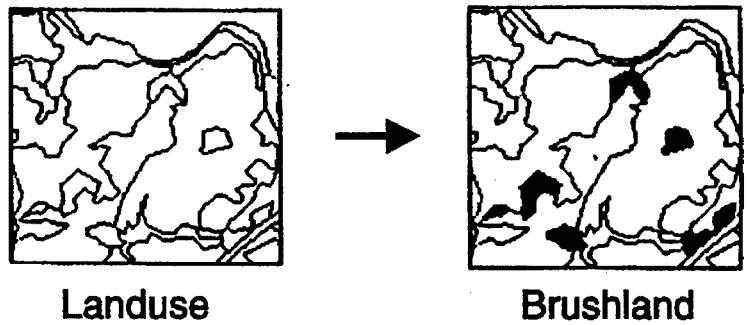
FIG. 1a is a schematic representation of a digitized landuse map of the prior art.
Figure 1B:
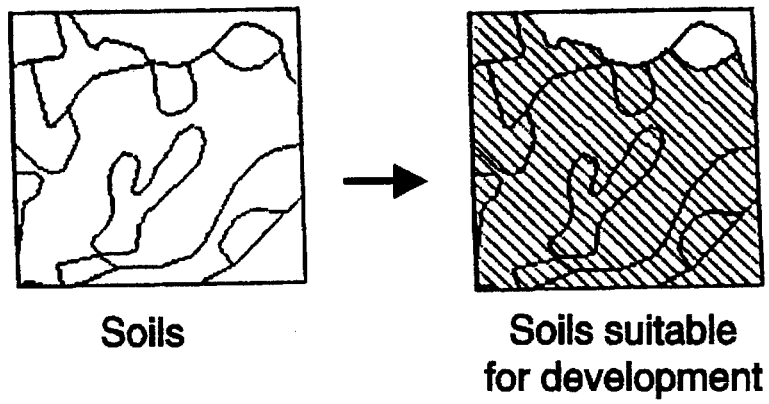
FIG. 1b is a schematic representation of a digitized soil map of the prior art.
Figure 1C:
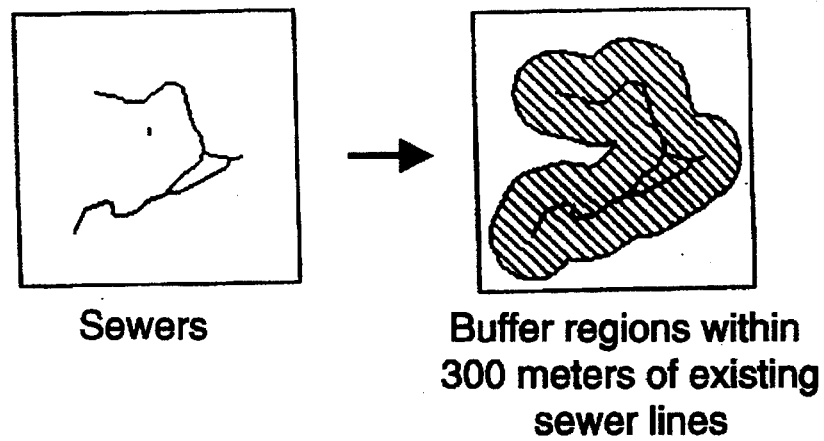
FIG. 1c is a schematic representation of a digitized sewer line map of the prior art.
Figure 1D:
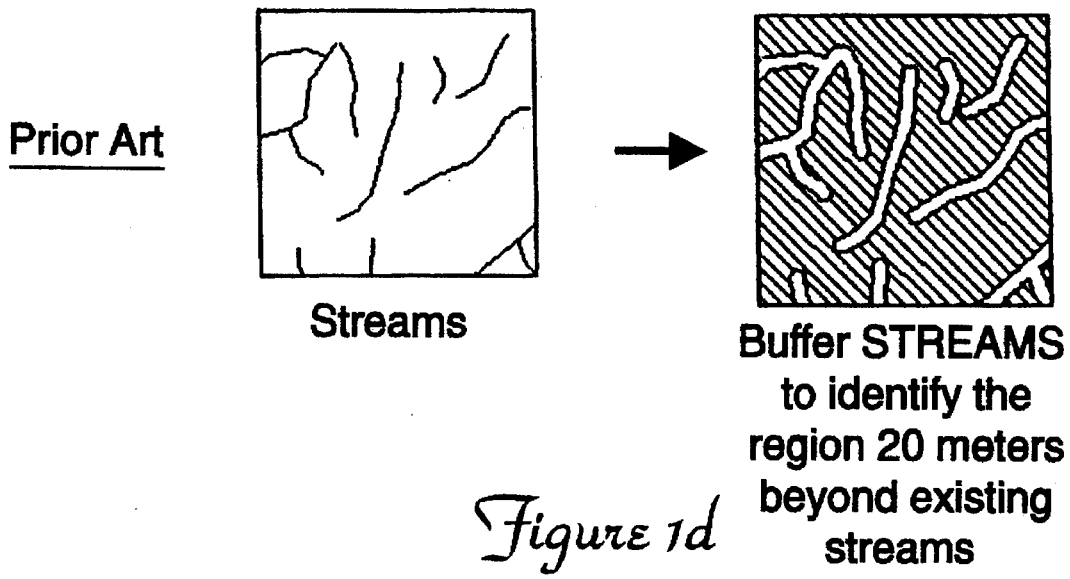
FIG. 1d is a schematic representation of a digitized stream system map of the prior art.
Figure 1E:
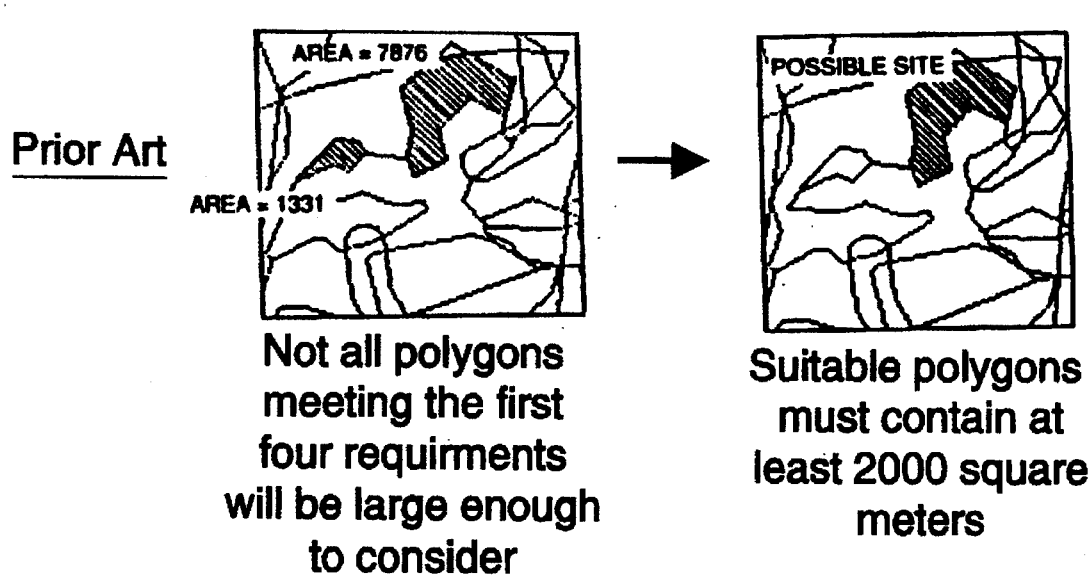
FIG. 1e is a schematic representation of digitized polygons containing size information of the prior art.

The ARC/INFO method digitizes five vector-based maps and then uses a multiple map overlay analysis to locate the site. The vector-based maps represent landuse (FIG. 1a), soils (FIG. 1b), sewers (FIG. 1c), streams (FIG. 1d), and polygonal area (FIG. 1e). The analysis includes the following steps:

Step 1. The digitized landuse map, FIG. 1a, is used to locate brushland.

Step 2. The digitized soil map, FIG. 1b, is used to map soil suitable for development.

Step 3. The digitized sewer line map, FIG. 1c, is used to create buffer regions within 300 meters of existing sewer lines.

Step 4. The digitized stream system map, FIG. 1d, is used to create buffer streams to identify the region 20 meters beyond existing streams.

Step 5. The digitized polygons containing size information, FIG. 1e, are used to locate suitable polygons that meet the criterion of at least 2,000 square meters.

The problem is simple enough for a five-map overlay analysis. If, however, an additional criterion (of slope, for example) is required for site selection, then the ARC/INFO method would require yet another digitized map from existing digital elevation models (DEM). This means that the raster-based elevation data have to be somehow processed by an imaging processing method to extract slope information for each pixel, and then generate a slope-category map. After a hardcopy map is prepared, it will then be digitized or converted into a vector-based slope map for use by the ARC/INFO system.

If the digitized landuse map, FIG. 1a, is considered out of date, a current landuse map must be substituted for site selection. The ARC/INFO method may require that this task be subcontracted to an organization that can generate a vector-based landuse polygon map. In summary, a GIS without a digital image analysis capability is not efficient and effective for solving real-world GIS problems.

It is possible to provide the five maps in FIGS. 1a–1e in raster format plus two digital images: digital elevation and current SPOT satellite multi-spectral images (for landuse classification). Conventional image processing systems are incapable of solving the above site selection problem.

SPOT satellite images have three layers in the multi-spectral domain and one layer in the panchromatic domain. With one layer from the elevation data and five layers from the map data, this image processing system will have ten layers of information. If the SPOT image information can be converted to one landuse layer, the system would still have to handle seven layers of information.

RASTER FORMAT AS A UNIFIED DATA FORMAT

Since vector data can easily be converted to raster data, a raster data format is used herein to provide an environment for efficient and effective interlayer communication.

OBJECT AS A UNIFIED UNIT OF INTERLAYER FEATURE ANALYSIS

It is the general practice in GIS to code a feature (polygon) in terms of its attributes. Referring now to FIG. 2, there is shown a typical, partial GIS data dictionary formation, extracted from ESRI: 1992, p. 3–13. A data dictionary is a list that maintains, for each coverage, the names of attributes (e.g., size, shape, texture, intensity, location, etc.) and a description of attribute values.

A polygon with landuse code of 300 is defined as brushland. This method can be extended to define an object in terms of a list of feature attributes. Moreover, this predetermined object must be used to perform communication between varying information layers of the prior art.

In the present invention, many shape, size and texture variables (e.g., CONVOLUTION, ELONGATION, CONSTRICTION, LINEARITY, SHAPELESSNESS, NUMBER_OF_PIXELS, INTENSITY and MEAN_DEVIATION) are generated online. The shape variables are normalized by monotonic nonlinear functions of definitions hereinbelow. The range of each of these functions is 0–10000. The exact form of each function has been chosen to roughly normalize the distribution of sampled values across a wide variety of images.

All of the other shape variables take the values exactly as specified in their definitions. In some cases (INCLINATION, ASPECT) these may be negative.

Shape variables are divided into two classes. The first is perimeter-based. These are primarily dependent on the outline of the object; "holes" in it have little or no effect. The second group is mass-based. They depend on the location of the pixels which make up the object. "Holes" can have a profound effect on them. Their definitions should make the distinction clear.

PERIMETER-BASED SHAPE VARIABLES

CONVOLUTION—The squared perimeter of a region divided by the number of pixels it contains provides an indication of how "spread out" it is. Very compact regions score low on this variable.

ELONGATION—The square of the longest chord across the perimeter (which need not lie entirely inside the region) divided by the number of pixels in the region. This is similar to CONVOLUTION. However, this variable helps to discriminate between high convolution caused by "amoeba" shape (many concavities) versus that caused by thinness.

CONSTRICTION—This variable is also amoeba-like. For every pair of perimeter pixels, the length of the perimeter separating them is divided by the linear distance between them. Thus at an "hourglass" location (as when an amoeba is about to divide) this quantity will be very large. CONSTRICTION is the largest such value for a region. A large value of this variable means that the region contains one or more bulbous protuberances which are loosely connected to the main body.

SHAPELESSNESS—This is a linear combination of the above variables plus LINEARITY, defined hereinbelow. It is approximately the first principal component across a variety of regions.

STRAIGHT—The percent (0–100) of the perimeter pixels which a region decided lie along a straight line. This need not be a single line; several oblique lines may contribute.

MASS-BASED SHAPE VARIABLES

LINEARITY—This is similar to ELONGATION, but also demands that the region lie along a straight line. Thus a thin crescent which comes nearly full circle would have large ELONGATION but small LINEARITY. This variable is derived from the ratio of the eigenvalues of the second order moment matrix.

ASPECT—This is 1000 times the natural log of the ratio of the second order (2,0) central row moment to the second order central column moment. Circular, square, etc. objects will score 0 on this variable. Tall, thin objects will score high (10000 max), while short, wide ones will score low (−10000 min).

INCLINATION—This is the angle in degrees (−90 to 90) of the principal axis relative to horizontal. If the right side of the object is higher than the left, this variable will be positive. Tall, thin objects will have INCLINATION whose absolute value is close to 90. This variable is useful only if LINEARITY is high. Low LINEARITY regions do not have a well defined principal axis.

TEXTURE VARIABLES

TEXTURE—100 times the mean first neighbor contrast (both vertical and horizontal). This measures local texture.

DEVIATION—100 times the mean deviation for the entire region. This measures global texture.

DIVERSITY—10000*(DEVIATION/TEXTURE−1). This expresses the global tone variation relative to the local variation. Fairly uniform regions, regardless of their texture, will have small values of DIVERSITY. A large value indicates that the region probably consists of several distinct sub-regions.

MAXTONE—The tone of the brightest pixel.

MINTONE—The tone of the darkest pixel.

Seven spectral layers are provided in LANDSAT's Thematic Mapper (TM) satellite imaging system. Water from the Near Infrared (NIR) layer can be extracted easily by this feature attribute:

Water: if NIR spectral value is less than 10. (Water is an object, NIR<10 is the defining criterion.)

River: if an object (Water) has an Elongation score greater than 9000 in a 1–10,000 scale. (River is a Water object that meets the Elongation attribute.)

Suppose that a hot object is extracted from the thermal layer or band of the TM system as follows:

Hot_Object: if thermal value is greater than 150 in a 0–256 scale in TM's Thermal band.

Moreover, Near-River Hot_Object is a Hot_Object and is located within, say, 200 meters from the River.

The extraction of Near-River Hot_Object is achieved by a process of interlayer communication between the NIR band and the Thermal band. This demonstrates that once a GIS capability is built into an image processing system, interlayer communication can be achieved by an object-oriented information coding system. The GIS approach is explicitly defined by a spatial relationship communication.

VERTICAL AND HORIZONTAL COMMUNICATION AS THE MEANS FOR INTER-OBJECT COMMUNICATION

The above example illustrates interlayer communication among objects. This capability is achieved by linking objects through a commonly-referenced locational system. For instance, if a River is defined, the geographical location of each River pixel is known. By the same principle, the location of each Hot_Object pixel is known. A Near-River Hot_Object is defined by a two-way linkage process: first, through the vertical linkage by cutting through multiple layers; and second, through the horizontal linkage by traversing various spatial locations.

A shortcut for inter-object communication can be achieved through the use the word "is," which defines a one-to-one relationship of equivalence. Multiple objects can be linked through additional feature attributes, such as by the object identification rule, "River is Water that has Elongation greater than 9000." This capability provides the means for a tree-structure based object classification system, such as the following classification scheme:

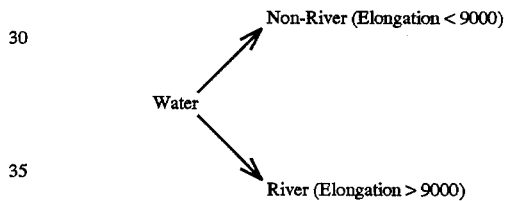

By the same principle, this classification scheme can be used for Hot_Objects via vertical and horizontal information linkages:

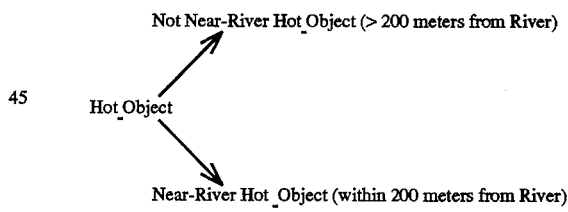

The means for achieving interlayer and crosslayer communication is achieved through the use of a set of spatial vocabularies, such as "within," "inside" and so on. This is because, existing in varying layers, these objects can share a common geographical region, a common boundary, or have certain definable topological relationships.

MEANS FOR ESTABLISHING FUZZY RELATIONSHIPS

The foregoing object classification scheme provides a definite "yes or no" answer. In real-world conditions, however, a more flexible scheme is often needed to provide an answer, such as "maybe" or "There is a 75 percent certainty." For example, the object Water may be defined with a 90 percent confidence level in terms of this criterion: "NIR<15." By the same principle, Water with a 95 percent confidence level may be defined in terms of "NIR<5." This inventive process provides a means for attaching a confidence level to each object definition.

It is common in image processing to use confidence levels to deal with classification uncertainty, whereas conventional, commercial GIS systems are almost exclusively limited to the binary ("yes or no") approach. The present system provides a means for coupling uncertainty with the object identification process in the context of a fuzzy set logic analysis.

If an object is defined in terms of the existence of two previously defined objects, each having an associated confidence level, this derived object will also have an associated confidence level, which is computed from a set of commonly accepted fuzzy set rules. Simply stated, this invention provides a means for expanding the current GIS capability to include a more flexible definition of the existence of a certain object.

When a list of properties must all be true (the first, AND the second, AND the third . . .), they are said to be in logical conjunction. This is the case for the property list of a single definition. If any of them may be true (the first, OR the second, OR the third . . .), they are in logical disjunction. This is the case for multiple definitions of the same class in the same file. Finally, modus ponens is the basis for implication.

Consider the rule "If a thing is a dog then it has four legs." Then when a dog is analyzed, it is concluded that it has four legs. This is the rule used to classify each region for a given definition. The property list of the definition corresponds to the "if an animal is a dog", while classifying it as "having four legs" corresponds to classifying a region.

Combination of properties using these three concepts is well defined when they are all simple yes/no facts. But things become vastly more complex when they are "probably" true or false. Consider a confidence level of 80% that one property is true, and a confidence level of 60% that another is true. Then with what confidence level may it be asserted that both are true? Or either is true? Bayesian logic, while highly developed mathematically, is generally of dubious usefulness in real life situations. It requires far too much knowledge of joint probabilities to be applied to practical problems. In the above example, Bayesian logic would not be used to combine the 80% and 60% confidence unless their joint probabilities were known. Fuzzy set theory originally showed much promise, but it casts aside too much useful information. Confidence levels computed using fuzzy set theory often do not conform to "common sense" interpretations.

Other theories are available. One of these combines elements of both Bayesian and fuzzy logic. It has less mathematical basis than Bayesian logic, but makes intuitive sense. This is a set of rules, often called the "standard method" in many expert systems.

Table A compares the rules of disjunction, conjunction and modus ponens for the three most common methods.

TABLE A

| Method | Conjunction | Disjunction | Modus Ponens |
| --- | --- | --- | --- |
| Bayesian | P * Q | P + Q − P * Q | Ante * Conf |
| Fuzzy | min(P, Q) | max(P, Q) | Conf |
| Standard | min(P, Q) | max(P, Q) | Ante * Conf |

In the last column, Ante stands for the combined confidences of all antecedents, and Conf is the confidence factor for the conclusion. Note that the "standard method" is a combination of the best of the two most well-documented methods. By using the minimum and maximum for conjunction and disjunction, the Bayesian problem of joint probabilities is mitigated. But by multiplying the antecedent and consequent probabilities for modus ponens, much important information is preserved.

The following example shows how a confidence might be computed for a particular region. To simplify it, only class membership properties are used. All other properties (such as limited class, value of variable, global relations) are simple yes/no decisions. If any of them are false, the entire definition fails (gives confidence of 0). Otherwise they have no effect on the confidence. In practice, this is no limitation. Intermediate classes can always be defined with varying confidence. Suppose that the two following definitions are active:

A TANK [90] IS A HAS_ENGINE AND IS A HAS_TREAD.

A TANK [40] IS A HAS_TANK_SIZE AND IS NOT A HAS_WHEELS.

Let us consider a region which has been classified into these classes with the confidences:

has_engine: 80 has_tread: 70 has_tank_size: 100 has_wheels: 20

Then the confidence that this region is a tank would be computed as follows:

Step 1. Apply the conjunction rule to the first property list. The minimum of 80 and 70 is 70.

Step 2. Use modus ponens to compute the confidence in the first definition. 90*70/100=63.

Step 3. Apply the conjunction rule to the second property list. The minimum of 100 and 100−20=80 is 80.

Step 4. Use modus ponens to get the confidence in the second definition. 40*80/100=32.

Step 5. Apply the disjunction rule across all definitions. The maximum of 63 and 32 is 63. That is the overall confidence that this region is a tank.

MEANS FOR PERFORMING PARALLEL PROCESSING

Figure 3:
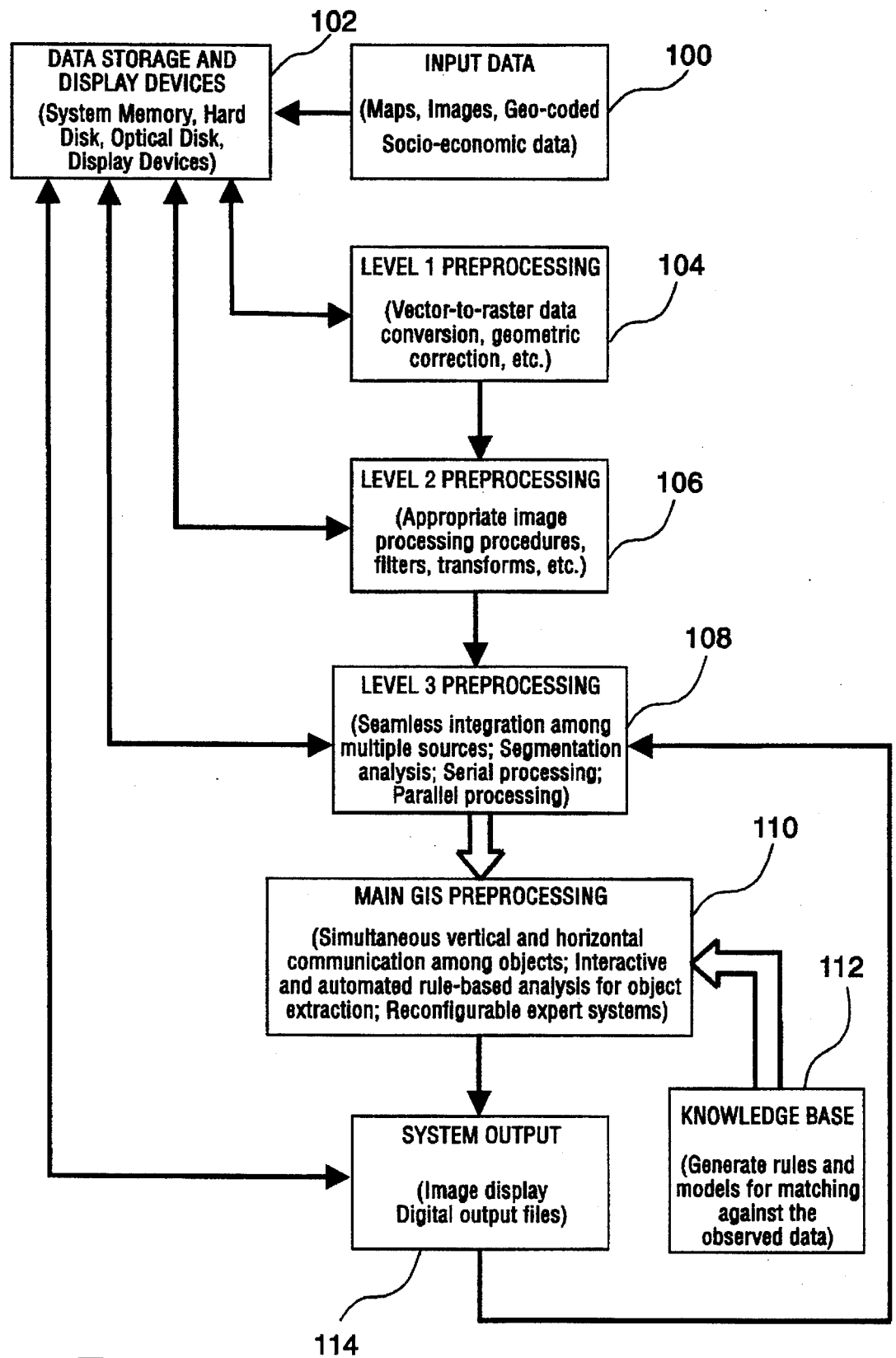
FIG. 3 is a block diagram depicting the image and map components, the knowledge base, and the flow of data in accordance with the present invention.
Figure 4A:
FIGS. 4a–4i are successive photographic displays produced as a result of expert system execution.
Figure 4B:
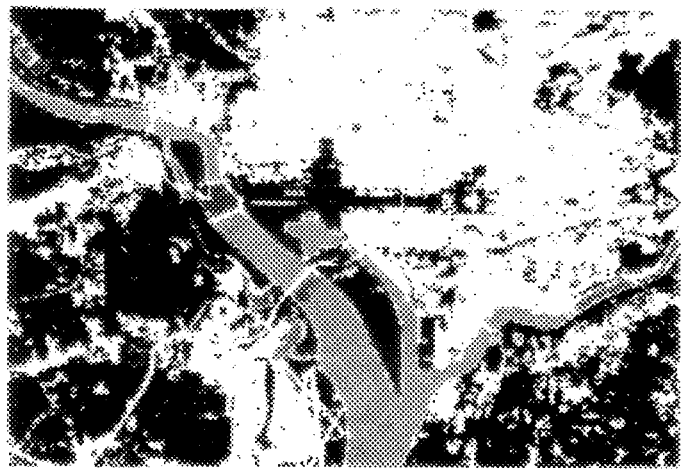
Figure 4C:
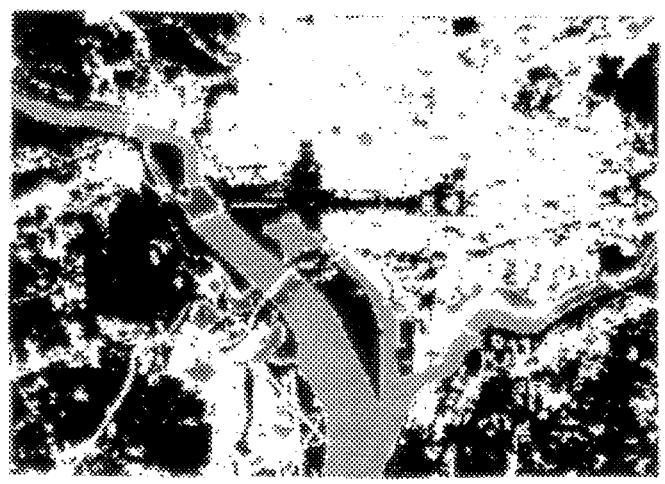
Figure 4D:
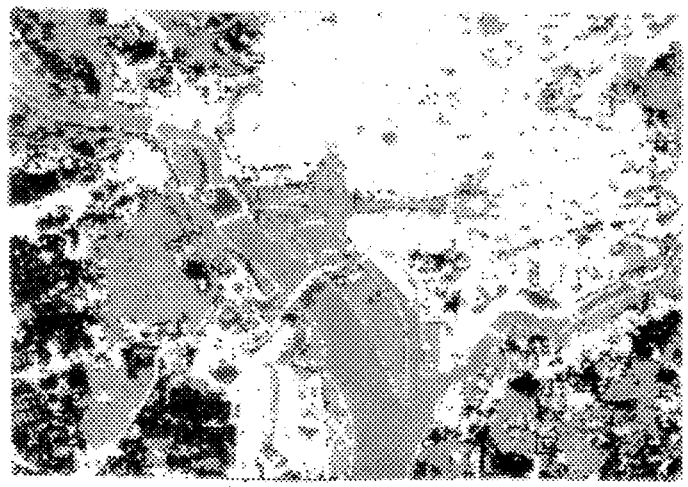
Figure 4E:
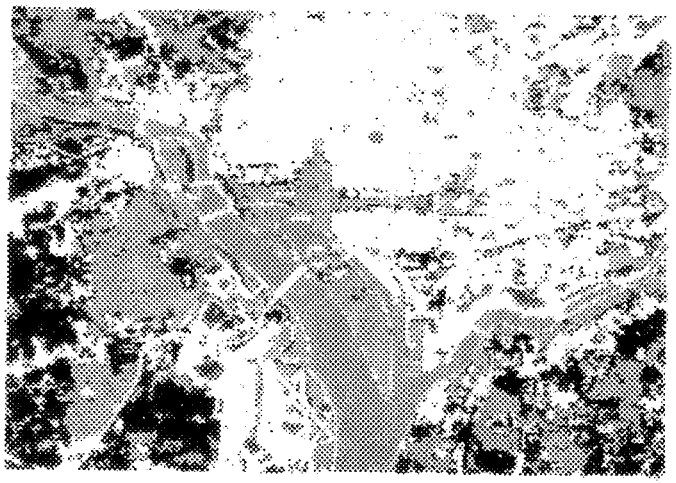
Figure 4F:
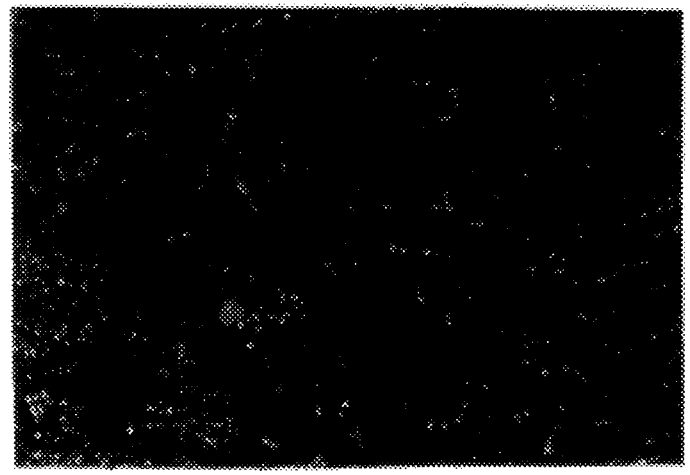
Figure 4G:
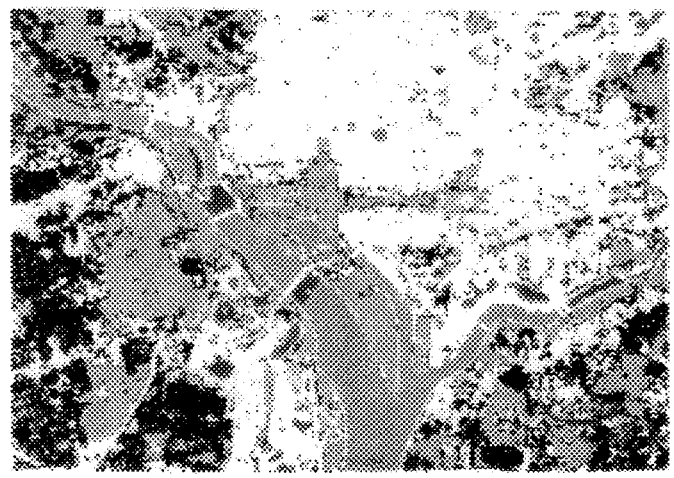
Figure 4H:
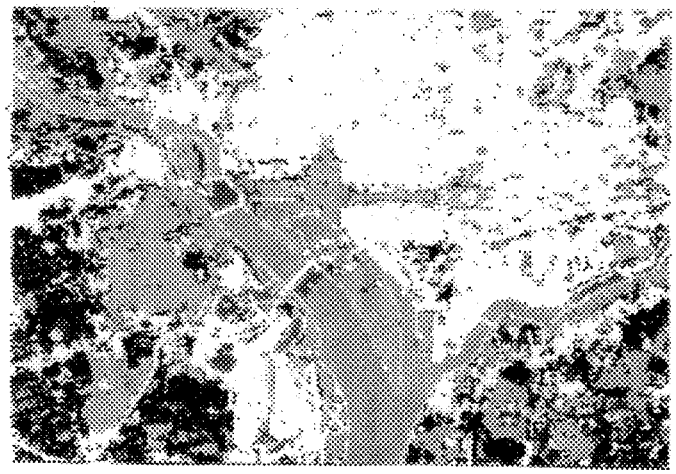
Figure 4I:
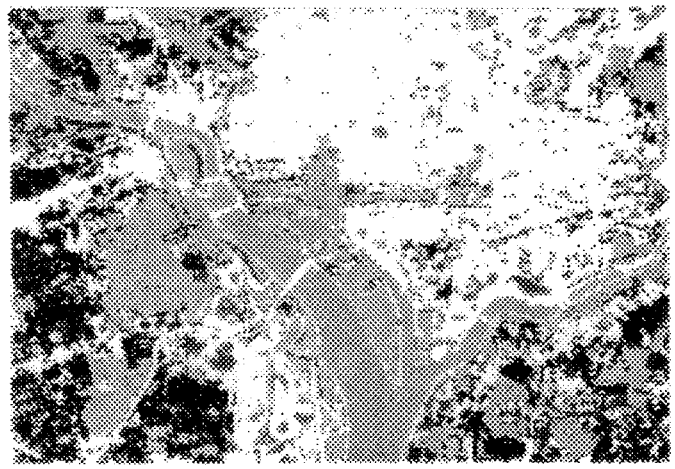

Referring now to FIG. 3, there is shown a block diagram depicting the image and map components, the knowledge base, and the flow of data in accordance with the present invention. For greater efficiency in information processing, means are provided for parallel processing in the area of image segmentation and object classification. If a processing environment does not have multiple processors, the system defaults to a serial processing environment.

The first component of the system is means for accepting various information sources as input to a second-generation GIS system, shown at reference numeral 100. The system accepts multiple data sources 100 for one common geographical area. The sources can be existing maps, geocoded, socio-economic data such as census tracks, and various images such as LANDSAT and SPOT satellite imagery. The most common information sources are images and maps. This component 100 allows all data to conform to a common format: a layer of information is equivalent to a data matrix.

A unique capability of this system is to accept multiple sources (layers) which are not perfectly registered. This capability is achieved by using an object instead of a pixel as the basic unit of analysis. Accordingly, the information sources can come from maps, perfectly registered multispectral image data, and not-perfectly-registered multi-sensor data. Slight misregistration between maps and images is permitted.

Class names are restricted to one word. Multiple word names, such as "body of water", are not allowed. When multiple word names are necessary, they are connected with an underscore: tank_with_hot_engine.

Properties must be separated by a conjunction (and, but) followed by a verb (is, are, has, have, touches, surrounds, etc.). For example: . . . AND IS A TREE AND HAS TONE>100 AND TOUCHES A . . . The system reviews syntax and warns the user if a mistake is suspected.

The input data 100 is applied to a data storage device, such as a system memory, a hard disk, or an optical disk, and/or to one or more conventional display devices, both storage and display devices being represented by reference numeral 102. Discs and memory 102 are used for efficient storage and retrieval.

All of the appropriate image processing and remote sensing analysis techniques can be used as preprocessors 104, 106 and 108 to the main GIS system processor 110, which performs the above-discussed GIS-based image analysis. A preprocessor can be as simple as a median filter; it can also be as complicated as a wavelet analysis of the image. The goal of preprocessing is to transform the incoming observed data into a format in which objects are readily extractable. If images are properly aligned, however, preprocessing levels 1 and 2 need not be performed at all.

If the images are "raw", of course, preprocessing is required. The level 1 preprocessor 104 is used to convert vector data to image (raster) data, to correct geometric and spectral errors, to perform resolution matching, to zoom, rotate and scale (so as to align the separate images with one another), and to filter and transform images, if necessary.

The level 2 preprocessor 106 is used for edge detection, special purpose feature separation, linear combination and multi-resolution functions. Image data must be preprocessed to the point that objects are readily extractable by the main processor. While the majority of level 2 preprocessing is to be performed using the segmentor of the main system, outside system processors, not shown, can be used to perform similar functions.

A multi-level resolution analysis method is used to define edges and then extract edge-based objects. For example, using bands 3 and 7 of the LANDSAT's Thematic Mapper imagery, a map (FIGS. 4a–4i) can be generated showing strong point features in the Washington, D.C. area. The level 2 preprocessing 106 provides the main processor 110 with a binary image: background of zero intensity value for non-edge based object, and 255 for objects of strong edgeness.

Once maps are converted into images, they can be processed to remove certain digitizing errors. In a broader sense, any means for digitizing and editing (manual or automated) map data can be considered as a preprocessor to the main second-generation GIS system of this invention.

The third level preprocessor 108 can be conceived as a "clearing house" for all incoming data. Regions are processed in such a way as to generate a scene structure. Once all the data sets are processed, each individual region in any layer can communicate with any other region in any layers. While many methods are available to provide this function, the inventive system uses an object-based segmentation scheme to generate regions for each individual layer. Each region is given a set of feature attributes which includes spectral intensity, size/shape/texture information of the region, and locational information of the centroid and the individual pixels in the region.

In the object-based segmentation scheme of this invention, neighboring regions are encouraged to, or discouraged from, merging together based upon their object-based attributes, rather than upon their intensity or texture, as is commonly practiced by the prior art. For example, if one region is relatively hot and its adjacent region is relatively cold (representing a large shadow), no merging occurs in accordance with a predetermined rule not to do so. (Rule(s) are used to interrogate the attribute database.) However, if the adjacent cold region is small (representing a portion of a vehicle), then the regions are encouraged to merge together, in accordance with another appropriate predetermined rule. Thus, advantages are manifest due to the fact that the merging process is object-based, rather than pixel-based.

Alternatively, classification by association can be achieved once the objects are separately identified and linked together, rather than merged.

The majority of classification methods in image processing and remote sensing literature belong to an aspatial approach. Any pixel based classification using a discriminant function, and any unsupervised clustering analysis-based classification scheme are aspatial in nature. Artificial intelligence-based or neural network-based classification approaches are also aspatial. Thus, the main system 110 accepts any appropriate means for object identification, as long as it uses the regions generated by level 3 preprocessor 108 as the basis of information analysis.

One of the simplest methods is to use a rule-based approach to define objects. For example, an object-defining rule is "Water: Near Infrared Intensity Value<15".

The rule-based interactive expert system of the invention is used to aid in the identification of specific objects in a segmented image. It may be used by human users as an exploratory tool for building databases of rules for classifying objects, and may also be guided by these rules in the classification of images. Facilities for color display of classification results are available, as shown in FIGS. 4a–4i.

The rules available go far beyond simple specification of properties such as size, tone, shape and texture. They include spatial relationships between objects. (AN ENGINE IS INSIDE A TANK BODY AND IS ABOVE A TREAD). Special classes which are interdependent collections of two or three other classes may be defined. (A TANK CONSISTS OF A GUN AND A BODY AND A TREAD.) A wide variety of interactive interrogation is also available. (WHICH TANKS ARE NOT TOUCHING A TREE?)

Several segmented images may be accessed simultaneously. These may be derived from different registered bands, or different degrees of segmentation of one band, or a mixture of both. Global relationships may then extend across files. For example, an engine in one file could have the property of being inside a body in another file.

A spatial relationship-based classification method is inherent in a GIS system, but it is rarely pursued by image processing researchers. The present invention provides the means for effective and efficient object classification using spatial relationship principles and languages. The system can accept expert system rules written in English (as long as specific syntax is obeyed) or simple execution rules utilizing a given spatial vocabulary, including words such as "inside", "within n (pixels)", "surrounded by", etc.

For example, a Courtyard can be defined as grass having a small size, and a Hot_Object as a region having a high intensity value in a thermal band. The Pentagon can then be defined as a Hot_Object of certain size and "outside" the Courtyard. The classifier can then be requested to search for this object called Pentagon.

Although the entire system of information is extremely complicated as presented through the discussion of the above system components, a system 110 has been provided herein by which the entire object extraction process can be controlled by a set of expert system rules 112. In addition, the expert system rules 112, written in either English-based phrases or equivalent symbolic expressions, are readily reconfigurable for another batch run. Therefore, the entire object extraction process can be automated to the degree that the user need provide only the names of the input files and output files, if needed.

The invention provides an environment for parallel processing in the level 3 preprocessor 108 and the main processor 110. In the preferred embodiment, the program is written for a parallel processor manufactured by the Transputer Company, but it should be understood that any appropriate parallel hardware/software system can be used. Parallel processing is not a required feature of a GIS system, but it has been found to be a desirable feature for any information extraction system.

MAIN GIS ANALYSIS: SERIAL AND PARALLEL OPTIONS; INTERACTIVE AND AUTOMATED OPTIONS

Spatial and aspatial information processing methods can be intermixed to perform object extraction in the context of a GIS system. An interactive processing option is provided to the user for a maximum interaction with the main processing system. While object extraction is performed via an expert system having a rule set, maximum interaction between the user and the GIS system is provided by allowing the user to insert a "display" statement anywhere in the rule set.

The system allows the user to perform GIS analysis in a totally automated environment through the use of the expert system 110 and 112 to control the entire object extraction process. To achieve maximum programming efficiency, the system provides a unique environment for the user to use a list of rules to extract objects. In addition, the rules can be constructed using a English-like language or equivalent symbolic structures. Once the rule set is tested, it can be used to perform object extraction in a totally automated mode.

Since the system accepts rules written in an English-like language, the rule set can be modified for any other applications. This mode is called a Reconfigurable Expert System.

The result of a GIS analysis can be displayed 114 by using a standard graphic adapter such as a super VGA in a PC system. In addition, the system can output results in an image data file, which can be displayed later using a graphic display system.

The result of a GIS analysis 114 can be the source (input) for another GIS analysis, performed by the level 3 preprocessor 108.

Since an expert system comprises a set of rules for matching against the feature attributed the observed objects 112, correct match relies heavily on the appropriate rules. Therefore, a sound knowledge base for constructing rules should be considered an integral part of the system. This knowledge base 112 should also include any object models, such as 3-D models of ground vehicles and any other objects to be sought by the system.

EXAMPLE OF OBJECT EXTRACTION

The following expert system is an actual, executable file that generates the photographs shown in FIGS. 4a–4i.
Classification by TM Greenness and Other Bands
Bands=6;
Modify 6=EXPAND;
Band 9=0.85468*Band4+0.05493*Band5−0.24717*Band1−0.16263*Band2−0.40639*Band3−0.11749*Band7;
/*Above is the Greenness Transformation*/
Band 10=(Band6>140)*250*Band6;
Band 11=(Band9>30)*250*Band9;
Show Rules=No;
Show Initial Image=Yes;
Initial Cutoff 9=0;
Segmentation Type 9=Local;
Merge 9=INIT+3, 1; /*region growing*/
Seek Nongreen; /*start to extract object called Nongreen*/
Region Nongreen: [#1 Tone 9=(0 10)];

The foregoing code defines Nongreen as Band 9 Tone in terms of the range value from 0 to 11 using data from Merge #1 (region growing).
Display Nongreen=YELLOW; (See FIG. 4a)
Initial Cutoff 4=3;
Segmentation Type 4=Global;
Merge 4=INIT;
Seek Water;
Region Water: [#1 Tone 4=(0 20)];
Seek River;
Region River: [is Water] [#1 Size 4=(500 30000)];
Display Nongreen=YELLOW Water=BLUE River=CYAN; (See FIG. 4b)
Initial Cutoff 10=10;
Segmentation Type 10=Local;
Merge 10=INIT;
Seek Hotbuilding;
Region Hotbuilding: [#1 Tone 10=(200 255)];
Display Nongreen=YELLOW Water=BLUE River=CYAN Hotbuilding=MAGENTA; (See FIG. 4c)
Initial Cutoff 11=10;
Segmentation Type 11=Local;
Merge 11=INIT;
Seek Vigvege; /*Vigvege stands for vigorous vegetation*/
Region Vigvege: [#1 Tone 11=(200 255)];
Display Nongreen=YELLOW Water=BLUE River=CYAN Hotbuilding=Magenta Vigvege=GREEN; (see FIG. 4d)
Seek Courtyard;
Region Courtyard: [is Vigvege] [#1 Size 11=(1 20)];
Courtyard is defined a small-size (<20 pixels) Vigvege in Band 11 from Merge #1 data
Display Nongreen=YELLOW Water=BLUE River=CYAN Hotbuilding=MAGENTA Vigvege=Green Courtyard=BLUE; (See FIG. 4e)
Seek Pentagon;
Region Pentagon: [is Hotbuilding] [#1 size=(150 500)] [Outside Courtyard];
Display Courtyard=Green Pentagon=RED; (See FIG. 4f)
Pentagon is defined in terms of three criteria:
 a) a Hotbuilding;
 b) of Size ranging from 150 to 500 pixels;
 c) Outside of a Courtyard; this a spatial relationship criterion.
Initial Cutoff 8=10;
Segmentation Type 8=Local;
Merge 8=INIT;
Seek Pointfeature;

Region Pointfeature: [#1 Tone 8=(200 255)1;
Display Pointfeature=MAGENTA Pentagon=RED; (See FIG. 4g)
Seek Point Complex;
Region Point Complex: [is Pointfeature] [within 15 Hotbuilding];
Seek Building Complex;
Region Building Complex: [is Hotbuilding] [within 15 Pointfeature];
Display PointComplex=MAGENTA BuildingComplex= MAGENTA; (See FIG. 4h)

The above two features, PointComplex and BuildingComplex, are defined entirely in terms of spatial relationship: within a distance of 15 pixels from each other. Therefore, they exist in terms of a paired structure.

Display Nongreen=YELLOW Water=BLUE River=CYAN Vigvege=GREEN PointComplex=MAGENTA BuildingComplex=MAGENTA Pentagon=RED; (See FIG. 4i)

ENGLISH-LANGUAGE PROGRAM

The following rule-based expert system program for object/feature extraction is written in English-language form and is substantially equivalent to the foregoing symbolic language format. Of course, depending upon the preference of the user, other natural languages (e.g., German, French) could also be used.

A. Input Files:
read dc432t1
read dcfc11
read dcfc22
read dctmcst1
read dctmcst2
read combo
read dc61fca
read w1grn1t B. Rules:
a water, 0 has tone<20
display water=blue
a river, 0 is a water and has elongation>9999
display water=blue river=cyan a hot, 6 has tone>140
a hotarea, 6 is a hot and touches a hot, 6
display hotarea=white
a pointfeature, 5 has tone>20
display water=blue river=cyan hotarea=white pointfeature= red
a livevege, 3 has tone>1
display water=blue river=cyan pointfeature=red
livevege=green a courtyard, 3 is a livevege and is strictly inside a hotarea, 6
display hotarea=white courtyard=green
a centeryard, 3 is a courtyard and is within 7 of a hot area, 6
display hotarea=white courtyard=green centeryard=magenta
a buildup, 1 has tone>34 and has tone<38
display buildup=yellow
display water=blue river=cyan livevege=green buildup= yellow pointfeature=red hotarea=white
display water=blue river=blue livevege=green buildup= yellow pointfeature=cyan hotarea=white
a gmbuiltup, 7 has tone==10
display gmbuiltup=yellow
a grnvege1, 7 has tone==150
a grnvege2, 7 has tone==90
a grnvege3, 7 has tone==30
display gmbuiltup=blue grnvege1=red grnvege2=magenta grnvege3=green

APPLICATION OF THE INVENTION TO PREVIOUSLY CITED ARC/INFO PROBLEM

Recall the aforementioned ARC/INFO problem in terms of the selection criteria using five map layers:
Preferred land use is brushland;
Choose soil types that are suitable for development;
Site must lie within 300 meters of existing sewer lines;
Site must lie 20 meters beyond existing streams; and
Site must contain at least 2000 square meters.

Since the site is to be selected from five layers of maps, each corresponding to one of the above features, criteria for defining Brushland and Suitable Soil are given explicitly. An expert system must be written to solve this problem using the system of the present invention.

Step 1. All of the vector-based maps are converted to raster images.
Step 2. A 300-meter Buffer zone is generated from data in sewer line map.
Step 3. A 20-meter Buffer zone is generated from the existing stream line map.
[Steps 1, 2 and 3 can be generated from any appropriate system including an ARC/INFO or from independent preprocessors.]
Step 4. Write an expert system to select the target site as follows:
This is an Expert System to Select the Lab Site
Bands=5;
Initial Cutoff=1; Segmentation Type=Local;
Since no band is specified, all five images are segmented simultaneously.
Merge=INIT; /*this is Merge #1 using the cutoff=1, same as INIT*/
Seek SiteSize;
Region SiteSize: [#1 Size 5=(2000 999999)];
/*assume 1 pixel=1 square meter*/

This is the Criterion number 5 in terms of size>2000 meters from layer number 5. Since layer number 5 has been segmented into regions, the system can find all the regions whose size is greater than 2000 square meters.
Seek Brushland;
Region Brushland: [#1 Tone 1=(200 255)];
The definition of Brushland is coded in Image Layer such as a tone value of 250. Therefore, it can be properly defined by the above rule.
Seek BrushlandSite;
Region BrushlandSite: [is SiteSize] [Inside Brushland];
Seek Sewer Buffer;
Region Sewer Buffer: [#1 Tone 3=(200 255)];
Seek Stream Buffer;
Region Stream Buffer: [#1 Tone 4=(200 255)];
The definition of Sewer Buffer and Stream Buffer is predetermined in terms of a known pixel tone value such as 250.
Seek FinalSite;
Region FinalSite: [is BrushlandSite] [Inside Sewer Buffer] [Inside Stream Buffer];
Display Brushland=GREEN SewerBuffer=CYAN StreamBuffer=BLUE SiteSize=WHITE BrushlandSite= MAGENTA FinalSite=RED;

The above expert system, executable using the invention, represents a process and a means by which an object is extracted using a set of hierarchical symbolic, logic rules without having to dealing cumbersome intermediate map preparation and generation as presented by the ARC/INFO method. The current invention eliminates all the unnecessary ARC/INFO intermediate steps by using efficient and effective means of interlayer and across-region communication among defined objects.

Other symbolic and English-language programs appear as Appendix A.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A method of analyzing combined image and map data utilizing a processing system that provides total, seamless integration, both vertical and horizontal, between image and map data, in order to recognize and identify objects disposed within said image and map data, said method comprising:
   a) transforming a variety of information sources, including maps and imagery, for a predetermined geographical area, into a mutually compatible, extractable format;
   b) defining features and regions of said maps and imagery representative of object information, using a multilevel process, wherein said object information within any level of said multilevel process communicates with each other using an object-based segmentation scheme, said segmentation scheme facilitating or discouraging a merger of neighboring regions of said information sources based upon attributes defined by a set of object-based rules, including spatial relationships;
   c) identifying and recognizing objects disposed within said information sources by comparing said object information with said object-based rules, said object-based rules being language-definable;
   d) obtaining object-based rules from a database; and
   e) recognizing objects by comparing object features of said objects with said obtained object-based rules of known object features and attributes.

2. The method of analyzing combined image and map data in accordance with claim 1, wherein said object-based rules are reconstructible using a non-English human language.

3. A method of analyzing combined image and map data utilizing a reconfigurable processing system that provides integration between image and map data, in order to recognize and identify objects disposed within said image and map data, utilizing a language-defined, object-based set of rules, said method comprising:
   a) transforming a variety of information sources, including maps and imagery, for a predetermined geographical area, into a mutually compatible, extractable format;
   b) defining features and regions of said maps and imagery representative of object information, using a multi-level process, wherein said object information within any level of said multi-level process communicates with each other using an object-based segmentation scheme, said segmentation scheme facilitating or discouraging a merger of neighboring regions of said information sources, based upon attributes defined by a set of object-based rules, including spatial relationships, said defining operation being facilitated by an interactive technique, whereby a statement can be inserted anywhere therein within said set of object-based rules; and
   c) identifying and recognizing objects disposed within said information sources.

4. The method of analyzing combined image and map data in accordance with claim 3, wherein said object-based rules are reconstructible, using a non-English human language.

5. A user-interactive method of analyzing combined image and map data, utilizing a processing system that provides integration between image and map data, in order to recognize and identify objects disposed within said image and map data, utilizing a language-defined, object-based set of rules that is user-modifiable, said method comprising:
   a) transforming a variety of information sources, including maps and imagery, for a predetermined geographical area, into a mutually compatible, extractable format;
   b) defining features and regions of said maps and imagery representative of object information, using a multi-level process, wherein said object information within any level of said multi-level process communicates with each other, and objects within said maps and imagery are recognizable by comparing them with attributes defined by a user-modifiable set of object-based rules, said object-based rules being part of a database and reconfigurable in a user-friendly human language; and
   c) identifying and recognizing objects disposed within said image and map data.

* * * * *